UNITED STATES PATENT OFFICE.

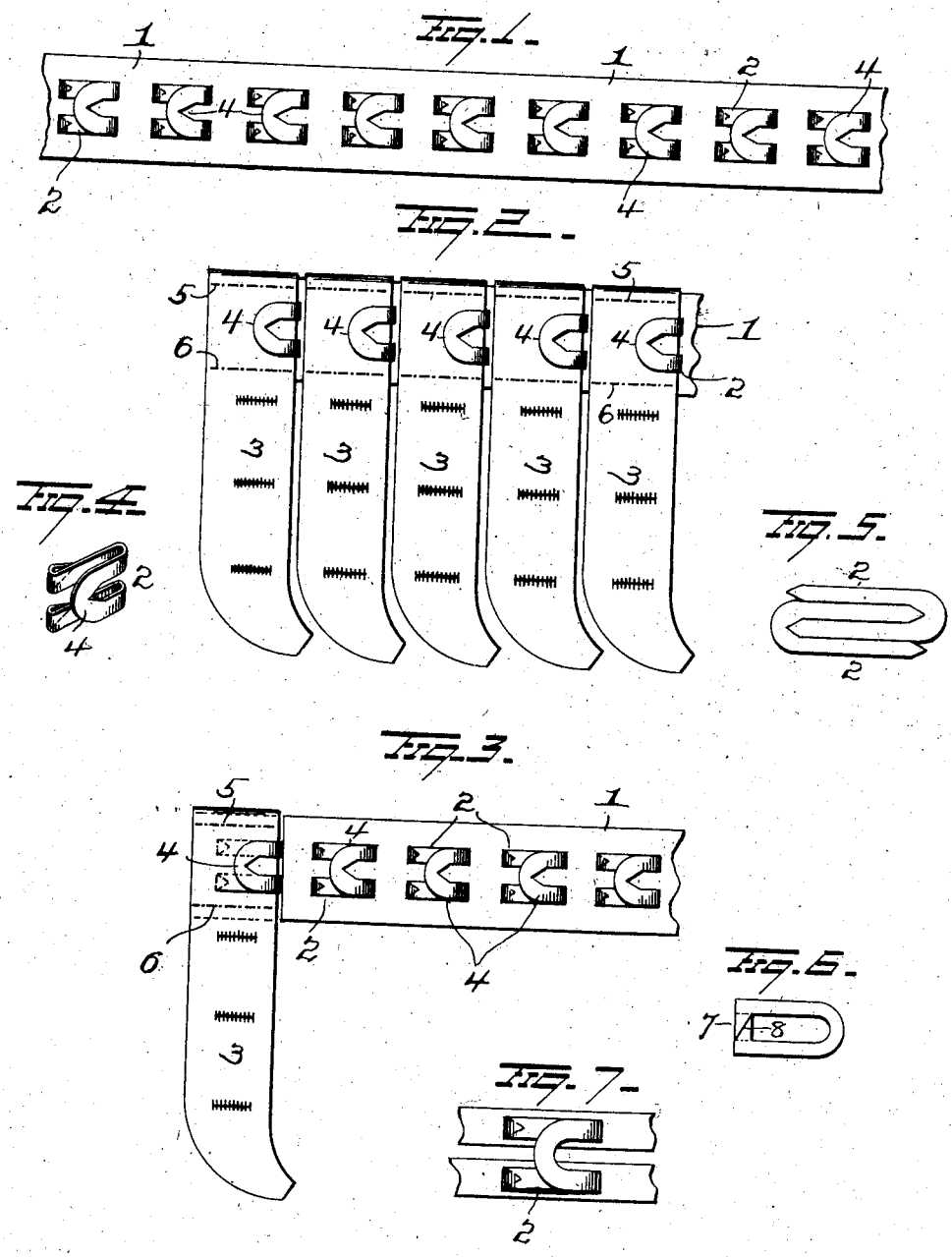

ABRAM F. STEIN AND SAMUEL F. STEIN, OF WILLIAMSPORT, PENNSYLVANIA.

HOOK FOR FLIES OF TROUSERS.

No. 834,942.  Specification of Letters Patent.  Patented Nov. 6, 1906.

Application filed September 6, 1905. Serial No. 277,217.

*To all whom it may concern:*

Be it known that we, ABRAM F. STEIN and SAMUEL F. STEIN, of Williamsport, in the county of Lycoming and State of Pennsylvania, have invented certain new and useful Improvements in Hooks for Flies of Trousers; and we do hereby declare the following to be a full, clear, and exact description of the invention, such as will enable others skilled in the art to which it appertains to make and use the same.

Our invention relates to an improvement in hooks for flies of trousers, the object of the invention being to provide a simple form of hook that can be economically constructed, and capable of withstanding all strains to which such hooks are usually subjected.

With these ends in view our invention consists in the parts and combinations of parts as will be more fully described, and pointed out in the claims.

In the accompanying drawings, Figure 1 is a view in elevation of a tape or strip of textile material having a series of hooks permanently attached thereto. Fig. 2 is a similar view showing flies attached to the strip. Fig. 3 is a view of a single fly having a section of the strip containing the hook attached thereto after being severed of the rest. Fig. 4 is a view of one of the hooks detached. Fig. 5 shows one method of forming these hooks; Fig. 6 is a view of modfied form of hook, and Fig. 7 is a modified form of strip.

1 represents a strip or ribbon of textile material, and 2 a series of hooks secured to the same. These hooks are made of metal, preferably stamped from a blank, as shown in Fig. 5. Each blank is of a size sufficient to form two hooks, and when the latter are first struck up they are in the form of the letter U, one member of each hook resting between the two members of the other hook, thus avoiding any material waste in manufacture. After the hooks have been thus struck up from the blank the curved or closed end of each hook is bent over into hook form and the sharpened end of each member of each hook is bent to engage the strip. These hooks are considerably narrower than the width of the strip, so as to leave sufficient margin for stitching above and below the hook, and the hooks are separated from each other approximately the width of a fly, so that when the flies 3 containing the buttonholes are applied to the hooks and strip each hook will bear its proper relation to the fly.

The hooks 2 are first secured to the strip 1 with their hooks 4 arranged in the direction of the length of the strip by passing the sharpened ends through the strip and clenching them. The flies 3 are then assembled over the strip with the hook portions 4 of hooks 2 overlapping the flies, as clearly shown in Fig. 2. After the parts have been thus assembled the flies 3 and strip 1 are secured together by rows of stitching 5 and 6 extending transversely across the flies and longitudinally of the strip and above and below the hooks. This stitching firmly secures the hooks to the flies, one to each, and the flies are then separated by severing the strip between the several flies, and when the flies are attached to the trousers-front the section of the strip 1 containing the hook is further secured by the vertical lines of stitching used for attaching the flies to the trousers, running transversely of the strip.

In the specification and claims we have referred to the strip as a textile strip, and while we prefer to use a textile fabric as a securing base for the hooks we intend to comprehend by this term any material that can be stitched to the fly and severed by shears or other cutting means. We have also shown the strip 1 projecting beyond the hooks at both sides. While such a construction is preferable, the strip may project at one side of the hooks only and it will be strongly secured to the flies by extra stitching at its ends to the front or rear edges of the latter instead of one of the two rows of stitching 5 and 6. (Shown in Fig. 2.)

Instead of constructing the hooks as shown in Fig. 5 and described above they may be made as represented in Fig. 6. As shown in this figure both ends of the hook-blank are closed, but the inner end 7 is split diagonally, as shown at 8, forming two beveled prongs. To apply this hook to a strip, the beveled prongs are separated by bending the blank, after which the said prongs are forced through the strip and into contact, the prongs being below the strip. This firmly secures the hook to the strip and the latter is then ready for attachment to the flies, as above described. Each hook may be provided with more than one set of these prongs, so as to make the attachment extra strong.

In the construction shown in Fig. 7 the strip to which the hooks are attached is made of two narrow strips, the combined width of which is not greater than the width of the hook, but which when separated or spaced apart (each strip being engaged by the prong of one member of the hook) project above and below the hook for stitching, as described.

It is evident that the form of the hook may be varied in many respects without departing from the spirit of our invention. Hence we would have it understood that we do not confine ourselves to the construction of hooks described, but consider ourselves at liberty to make such changes and alterations as come within the spirit and scope of our invention.

Having fully described our invention, what we claim as new, and desire to secure by Letters Patent, is—

1. As a new article of manufacture, a strip having a series of fly-hooks secured thereto and a series of flies secured to said strip and overlapped by the free portions of said hooks.

2. As a new article of manufacture, a strip of textile material and a series of hooks secured thereto, the said hooks being separated from each other a distance sufficient to permit each hook to be secured to a pants-fly and a pants-fly secured to the strip coincident with each hook.

In testimony whereof we have signed this specification in the presence of two subscribing witnesses.

ABRAM F. STEIN.
SAMUEL F. STEIN.

Witnesses:
I. J. ALLEN,
SAM GORDON.